(12) United States Patent
Neil

(10) Patent No.: US 8,081,805 B2
(45) Date of Patent: Dec. 20, 2011

(54) FINGER SENSING DEVICE WITH MULTIPLE CORRELATORS AND ASSOCIATED METHODS

(75) Inventor: James W. Neil, Melbourne, FL (US)

(73) Assignee: Authentec, Inc., Melbourne, FL (US)

( * ) Notice: Subject to any disclaimer, the term of this patent is extended or adjusted under 35 U.S.C. 154(b) by 1218 days.

(21) Appl. No.: 11/765,270

(22) Filed: Jun. 19, 2007

(65) Prior Publication Data

US 2007/0292007 A1 Dec. 20, 2007

Related U.S. Application Data

(60) Provisional application No. 60/805,138, filed on Jun. 19, 2006.

(51) Int. Cl.
*G06K 9/00* (2006.01)

(52) U.S. Cl. ........ 382/124; 382/115; 382/116; 382/125; 382/126; 382/128

(58) Field of Classification Search ............ 382/124, 382/115, 116, 125, 126, 128
See application file for complete search history.

(56) References Cited

U.S. PATENT DOCUMENTS

| | | | | |
|---|---|---|---|---|
| 5,963,679 | A | 10/1999 | Setlak | 382/312 |
| 6,134,340 | A * | 10/2000 | Hsu et al. | 382/124 |
| 2001/0017934 | A1 | 8/2001 | Paloniemi et al. | 382/107 |
| 2003/0126448 | A1 * | 7/2003 | Russo | 713/186 |
| 2005/0012714 | A1 | 1/2005 | Russo et al. | 345/157 |
| 2005/0078855 | A1 | 4/2005 | Chandler et al. | 382/116 |
| 2005/0089203 | A1 | 4/2005 | Setlak | 382/124 |
| 2005/0152584 | A1 * | 7/2005 | Svedin | 382/124 |
| 2006/0088195 | A1 | 4/2006 | Tykowski et al. | 382/124 |

* cited by examiner

*Primary Examiner* — Mike Rahmjoo
(74) *Attorney, Agent, or Firm* — Allen, Dyer, Doppelt, Milbrath & Gilchrist, P.A.

(57) ABSTRACT

A finger sensing device may include a finger sensing area to receive a user's finger moved in a sliding motion, and a controller cooperating with the finger sensing area for generating successive image samples. Moreover, the controller may also generate the displacement estimate of the user's finger by at least performing a plurality of different image sample correlations between at least one pair of image samples, and cross-verifying results of the plurality of different image sample correlations.

24 Claims, 4 Drawing Sheets

US 8,081,805 B2

FINGER SENSING DEVICE WITH MULTIPLE CORRELATORS AND ASSOCIATED METHODS

RELATED APPLICATION

This application is based upon provisional patent application No. 60/805,138, filed Jun. 19, 2006, the entire contents of which are incorporated herein by reference.

FIELD OF THE INVENTION

The present invention relates to the field of electronic devices, and, more particularly, to sensors, such as for finger sensing, and electronic devices suing such sensors and associated methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,963,679 to Setlak et al., assigned to the assignee of the present invention, and the entire disclosure of which is incorporated herein by reference. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to use, and they provide reasonable authentication capabilities.

U.S. Published Patent Application No. 2005/0089203 also to Setlak, assigned to the assignee of the present invention, and the entire disclosure of which is incorporated herein by reference, discloses an integrated circuit biometric sensor that may sense multiple biometrics of the user, and that is also adapted to either a static placement sensor or a slide finger sensor. A slide finger sensor includes a smaller sensing surface over which the user's finger is slid. The images collected during the sliding process may be collected for matching, such as for authentication, or may be used for navigation, for example, U.S. Published Patent Application No. 2005/0078855 to Chandler et al., assigned to the assignee of the present invention, and the entire disclosure of which is incorporated herein by reference, discloses a finger sensor used for navigation. More particularly, a processor is coupled to the finger sensing area to generate a plurality of menu items on a display, and for scrolling an indicator along the menu items based upon static placement of a finger adjacent a selected portion of the sensing area.

U.S. Published Patent Application No. 2001/0017934 to Palonieme et al. discloses a cellular telephone including a finger sensor for sensing surface the relief areas of human skin, and a movement detector for detecting movement of skin across the sensor. A user interface is responsive to the finger sensor to perform navigation functions.

U.S. Published Patent Application No. 2005/0012714 to Russo et al. also discloses a finger sensor used in a portable electronic device that translates a difference between first and second positions on the sensor into a plurality of sets of signals. Each set of signals may be used to emulate the signals generated by an input device, such as a steering wheel, a mouse, a joystick, a navigation bar, a scroll wheel, and a pressure sensitive button.

U.S. Published Patent Application No. 2006/0088195 to Tykowski et al., assigned to the assignee of the present invention, and the entire disclosure of which is incorporated herein by reference, discloses a finger sensing device including a finger sensing area to receive a user's finger moved in a sliding motion, and a controller cooperating with the finger sensing area for generating successive image samples at least some of which are separated by different time intervals. The controller may generate finger movement signals based upon the successive image samples and the different time intervals. The controller may generate a plurality of repeating groups of ratio-metrically related image samples based upon the different time intervals. The reduced number of image samples may provide greater processing efficiency and reduced power consumption.

Image-to-image correlation for finger sensing is a well known method for image alignment to those skilled in the art. The process of correlation compares two images and computes a displacement in X and Y between them. However, simply setting thresholds and examining scores from a single correlator may not always be sufficient to make an accurate assessment of motion between two time varying images. In other words, correlators may have a significant shortcoming in that they make mistakes. These mistakes can cause havoc in a finger sensing system where the correct answer is needed, and when no answer may be better than a bad answer. For example, in a finger sensing navigation subsystem used as a pointing device, a single miscorrelation can cause the cursor to jump wildly on the screen.

SUMMARY OF THE INVENTION

In view of the foregoing background, it is therefore an object of the invention to provide a finger sensing device having enhanced displacement sensing and associated methods.

This and other objects, features and advantages in accordance with the invention are provided by a finger sensing device comprising a finger sensing area to receive a user's finger moved in a sliding motion, and a controller cooperating with the finger sensing area for generating successive image samples. Moreover, the controller may also generate the displacement estimate of the user's finger by at least performing a plurality of different image sample correlations between at least one pair of image samples, and cross-verifying results of the plurality of different image sample correlations. Accordingly, the overall accuracy of the motion or displacement estimation is increased.

Each image sample may comprise a plurality of pixels, and the different image correlations may comprise a first image correlation that generates a first correlation score based upon a number of matched pixels and a number of mismatched pixels. For example, the first image correlation may be based upon the number of matched pixels minus a weighted number of the mismatched pixels. In addition, the different image correlations may further comprise a second image correlation that generates a second correlation score based upon the number of matched pixels from a predetermined overlap area. Accordingly, the first and second image correlations are sufficiently dissimilar that their combined results enhance the estimation accuracy.

The controller, for each different image sample correlation, may generate respective rankings for different possible displacements. And, the controller may perform the cross-verifying based upon the rankings for the different possible displacements.

The controller may further determine a velocity of the user's finger based upon the displacement estimate. In addition, the controller may further perform a navigation function based upon the velocity of the user's finger.

In some situations, the controller may enter a coast mode based upon a failure of the cross-verifying. In this case and for navigation it may be better to not move the cursor at all than to move it incorrectly. Because updates may be performed every few milliseconds the user will not notice the missed data, however, an incorrect motion would be apparent.

Each displacement may comprise at least one of a translational displacement and a rotational displacement. The finger sensing area may comprise an array of electric field sensing pixels, for example.

In addition, the finger sensing device may be used in an electronic device, such as including a housing, a display carried by the housing, and with the finger sensing area carried by the housing. The electronic device may also include the controller cooperating with the finger sensing area for generating successive image samples. The controller may also generate the displacement estimate of the user's finger by at least performing a plurality of different image sample correlations between at least one pair of image samples, and cross-verifying results of the plurality of different image sample correlations.

A method aspect is for generating a displacement estimate of the user's finger as the user's finger is moved in a sliding motion over a finger sensing area. The method may include generating successive image samples, and generating the displacement estimate of the user's finger by at least performing a plurality of different image sample correlations between at least one pair of image samples, and cross-verifying results of the plurality of different image sample correlations.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout to indicate similar elements.

Figure 1:
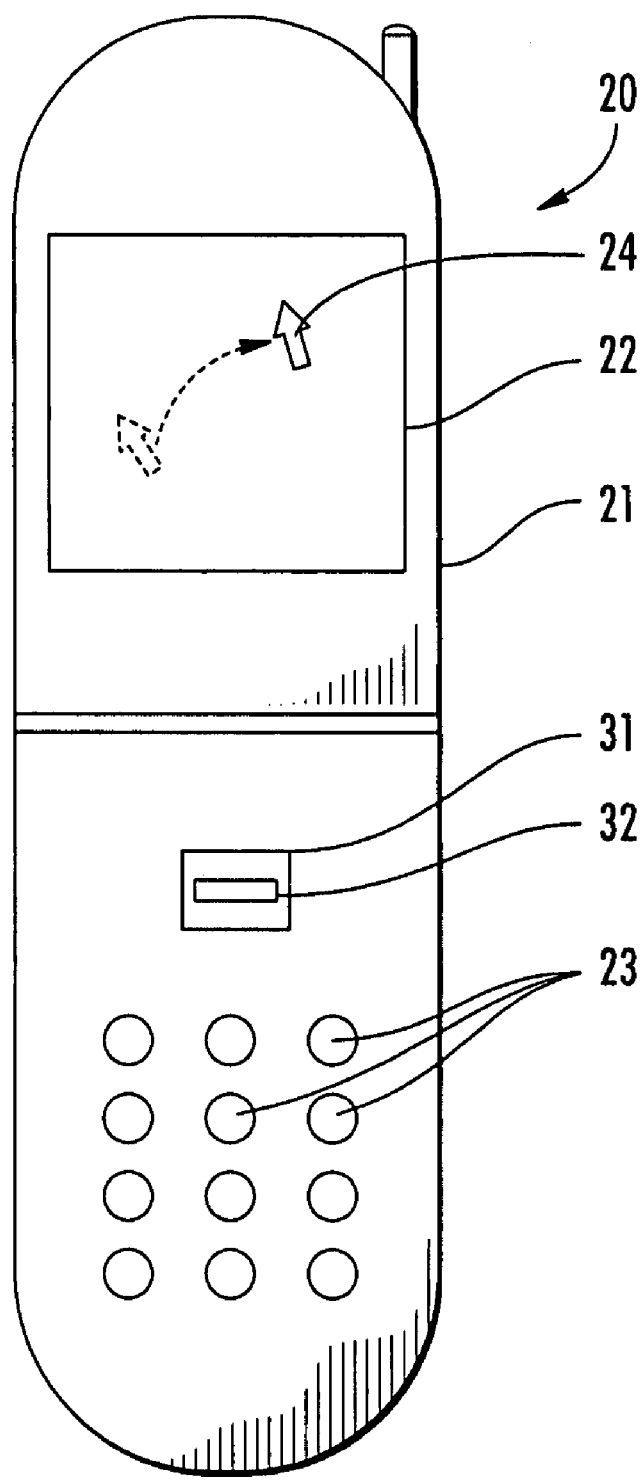
FIG. 1 is schematic front elevational view of an electronic device in the form of a cellular telephone and including a finger sensing device in accordance with the present invention.
Figure 2:
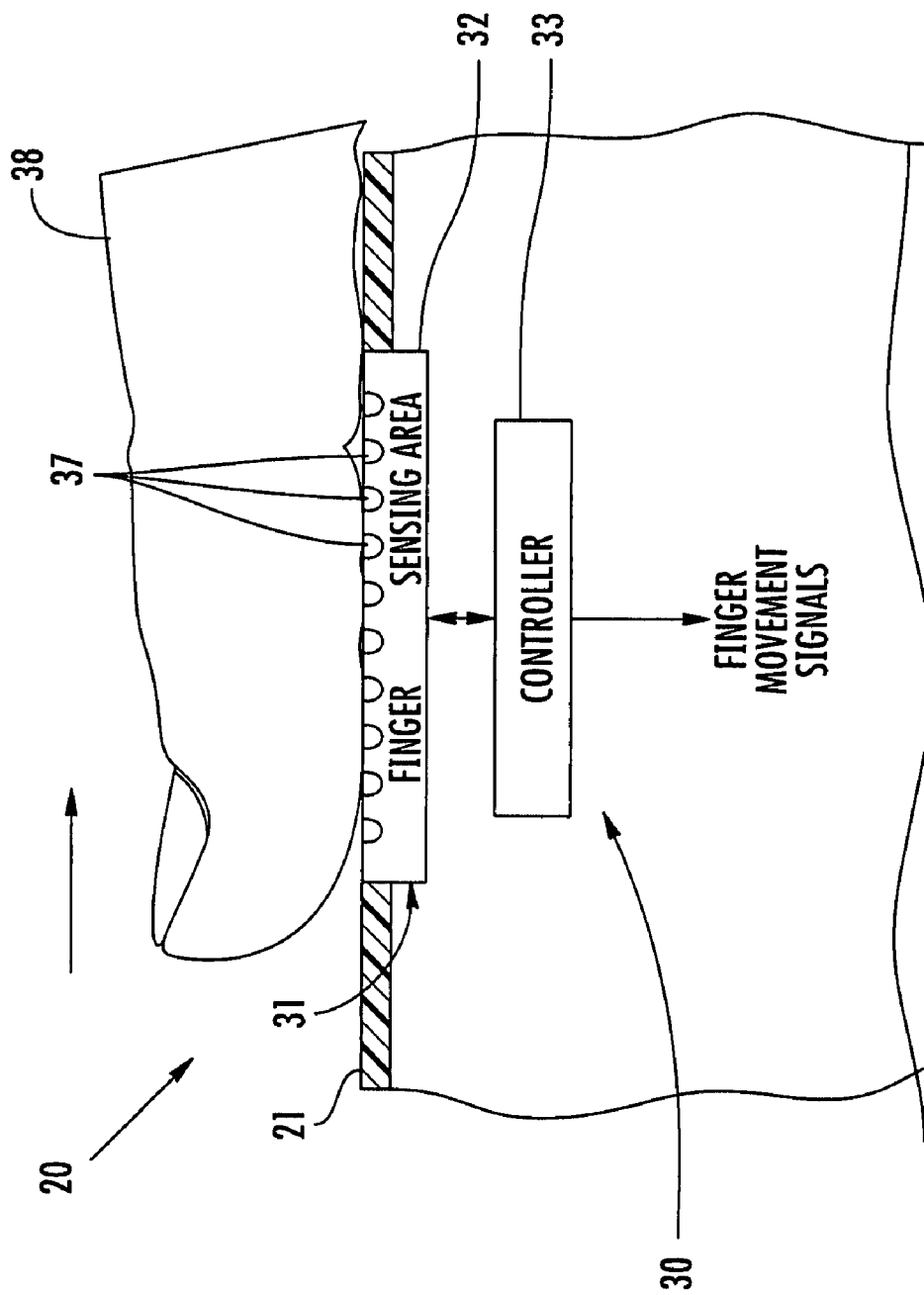
FIG. 2 is more detailed schematic diagram of a portion of the cellular telephone as shown in FIG. 1.

Referring initially to FIGS. 1 and 2 an electronic device in the form of a cellular telephone 20 includes the finger sensing device 30 according to the invention. The cellular telephone 20 is but one example of an electronic device that may benefit from the finger sensing device 30 as will be appreciated by those skilled in the art. The illustrated cellular telephone 20 includes a portable housing 21 that carries a display 22 and a keyboard 23. An integrated circuit finger sensor 31 is carried by the housing 21 and includes a finger sensing area 32 to receive a user's finger 38 (FIG. 2) moved in a sliding motion. The finger sensing area 32 may typically sense the image of ridges and valleys of a fingerprint, or may image other features of the user's finger, such as pores, or even subdermal features, as will be appreciated by those skilled in the art, Of course, other finger sensors could also be used.

The finger sensor 31 illustratively includes a controller 33 cooperating with the finger sensing area 32 for collecting image data therefrom. In some embodiments, the controller 33 may be provided by processing circuitry included on the integrated circuit substrate with the finger sensing area 32, and a host processor (not shown) as typically carried by the housing 21. Such a host processor for the cellular telephone 20 may typically perform the traditional processing for telephone functions, and may also have additional processing capability available for finger matching, finger navigation, etc. as will be appreciated by those skilled in the art. In other embodiments, the controller 33 may be implemented totally along with the finger sensing area 32 or in a separate integrated circuit as will also be appreciated by those skilled in the art. As described in greater detail below, the controller 33 can be used to generate finger movement signals, such as for navigation, that is, such as for control of a cursor 24 of the display 22.

The finger sensing area 32 illustratively includes an array of sensing pixels, such as electric field sensing pixels 37 formed on an integrated circuit substrate of the type as described in U.S. Pat. No. 5,963,679 to Setlak et al., assigned to the assignee of the present invention, and the entire contents of which are incorporated herein by reference of course, the finger sensing device 30 may be based upon other types of finger sensing as will be appreciated by those skilled in the art.

More particularly, the controller 33 may also generate the displacement estimate of the user's finger by at least performing a plurality of different image sample correlations between at least one pair of image samples, and cross-verifying results of the plurality of different image sample correlations. Each image sample may comprise a plurality of pixels, and the different image correlations may comprise a first image correlation that generates a first correlation score based upon a number of matched pixels and a number of mismatched pixels. For example, the first image correlation may be based upon the number of matched pixels minus a weighted number of the mismatched pixels. The different image correlations may further comprise a second image correlation that generates a second correlation score based upon the number of matched pixels from a predetermined overlap area. Each displacement may comprise at least one of a translational displacement and a rotational displacement as will be appreciated by those skilled in the art.

Considered in slightly different terms, a method aspect is for generating a displacement estimate of the user's finger 38 as the user's finger is moved in a sliding motion over a finger sensing area 32. The method may include generating successive image samples, and generating the displacement estimate of the user's finger by at least performing a plurality of different image sample correlations between at least one pair of image samples, and cross-verifying results of the plurality of different image sample correlations.

The controller 33, for each different image sample correlation, may generate respective rankings for different possible displacements. The controller 33 may perform the cross-verifying based upon the rankings for the different possible displacements as will be explained by an example below. The controller 33 may further determine a velocity of the user's finger based upon the displacement estimate, and this velocity estimate may be used for a navigation function, for example. Those of skill in the art will appreciate other desirable uses for the displacement/velocity estimation described herein.

By employing dual dissimilar correlators and cross-verifying their results, accuracy of better than 95% may be achievable. More importantly, in the remaining sub 5% of the cases when the correlations are wrong, the controller 33 knows the results are wrong and simply may not use them. In other words, the controller 33 may enter a coast state during that time interval of the failure of the cross-verifying by reusing the last known good value, some averaged value, or an otherwise smoothed value as will be appreciated by those skilled in the art. In this case and for navigation it may be better to not move the cursor at all than to move it incorrectly. Because updates may be performed every few milliseconds the user will not notice the missed data, however, an incorrect motion would be apparent.

Turning now to a particular example, two images are presented with the goal of finding the displacement in X and Y between them. Two exemplary correlators, a primary correlator and a secondary correlator, may be implemented as follows. The primary correlator holds one image still and translates the other one in X and Y comparing them at each translation looking for pixel-to-pixel differences. The X and Y translation producing the best score is saved. The X and Y translation producing the second best score is saved as well. When translating the image in the X and Y, pixels are lost from the edges, making the overlapped area slimmer than the original image. Various techniques can be employed to compensate the scores for this difference in area, such as normalizing the score relative to the area of overlap. For example, one possible correlator employs a formula that heavily penalizes the pixel-to-pixel differences: Correlation Score=Number of Matched Pixels (N×Number of Mismatched Pixels).

Figure 3:
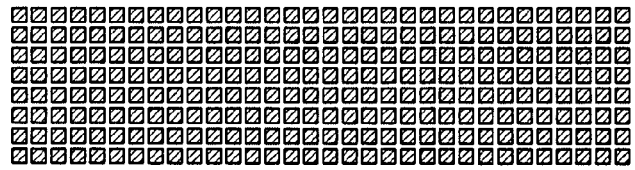
FIGS. 3a-3c are schematic diagrams for variable overlap area correlations at three different possible displacements in accordance with the invention.
Figure 3:
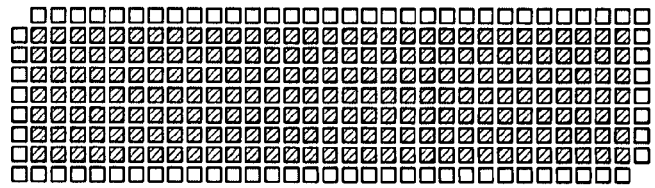
Figure 3:
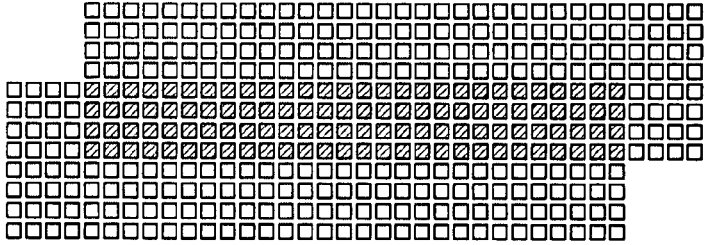

With additional reference to FIGS. 3a-3c, the area of overlap varies with the X and Y translation being tested. The overlap area of comparison for the X=0, Y=0 case is shown in FIG. 3a. FIG. 3b shows the area for the X=1, Y=1 case, and FIG. 3c shows it for the case of X=4, Y=4. The overlap area varies from 256 for case (a) to 217 for case (b), and finally to 112 for case (c).

Figure 4:
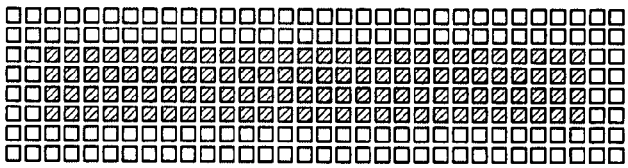
FIGS. 4a-4c are schematic diagrams for fixed overlap area correlations at three different possible displacements in accordance with the invention.
Figure 4:
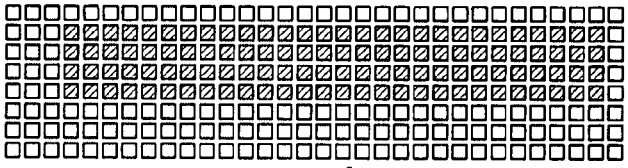
Figure 4:
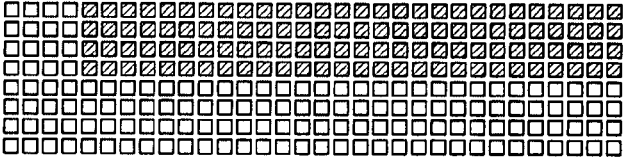

An exemplary secondary correlator may operate in a similar fashion, holding one image still while translating the other in X and Y and counting the pixel-to-pixel differences. This correlator works with a fixed size area, using the maximum overlap achievable at the extremes of translation. The exact same number of pixels (112 in this example) is used for producing a score at each translation in X and Y, as illustrated in FIGS. 4a-4c. Due to the fixed area of overlap, no score compensation is required. Just like the primary correlator, both the best and second best X and Y translations may be saved.

Finally, the winning translations at X and Y are compared as follows:
1. Primary's best against secondary's best
2. Primary's second best against secondary's second best
3. Primary's second best against secondary's best
4. And finally, primary's best against secondary's second best.

When any of these agree, in the order specified above, that X and Y translation is chosen as the winner. If none of the comparisons agree then the translation for the pair of images is simply ignored. At no time need the value of the score used for the comparison (except for choosing the best and second best during the correlation cycle itself).

Figure 5:
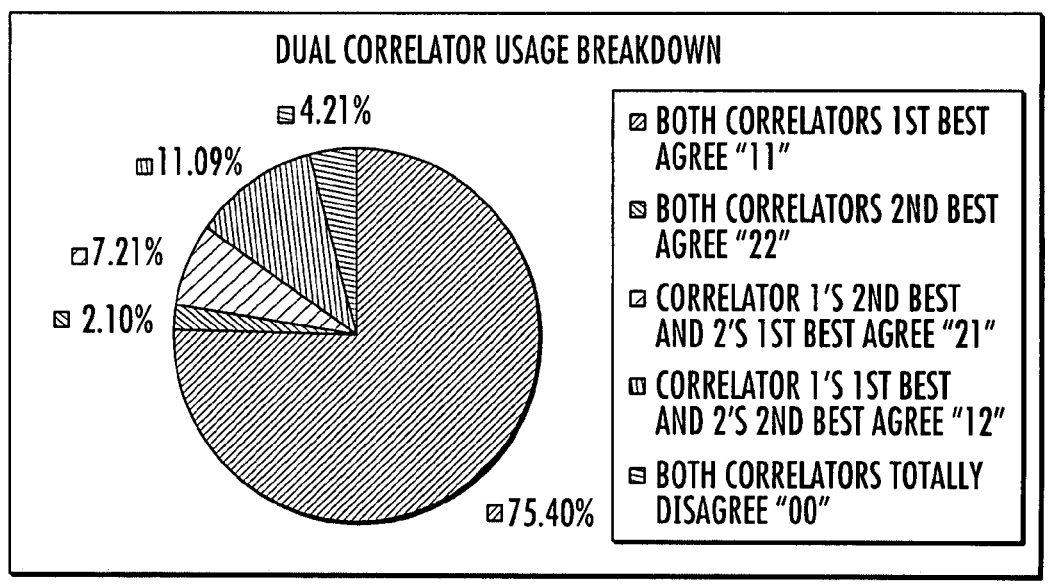
FIG. 5 is a chart of agreement of dual dissimilar correlator results in accordance with an example of the present invention.

With additional reference to FIG. 5, there is provided a graph showing the breakdown in percent of frequency of success of the approach described broken down by correlator and first/second-best using a sample of almost 160,000 motions. Note that only in 4.21% of the time is there not a verifiably good correlation. Even in that case there is enough known not to use the erroneous information.

Also note that if one were to use only one of the correlators, the wrong decision would be made almost 25% of the time and one would have no way of knowing that the information was wrong. Examination of the scores and placing a threshold may not be a good substitute for the multiple correlator approach described herein as many times a weak score still yields the correct answer and conversely a strong score can be associated with a very bad X and Y translation.

The devices and approaches described herein address an age old problem of knowing when to trust the output of a correlator and is an important advantage. It improves the overall accuracy of our motion estimation techniques. As will be readily appreciated by those skilled in the art, the two image sample correlators described herein are but two examples, and there are many other correlators that may be similar used. Accordingly, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A finger sensing device comprising:
   a finger sensing area to receive a user's finger moved in a sliding motion; and
   a controller cooperating with said finger sensing area for
      generating successive image samples, and
      generating a displacement estimate of the user's finger by at least performing a plurality of different image sample correlations between at least one pair of image samples, and cross-verifying results of the plurality of different image sample correlations.

2. The finger sensing device according to claim 1 wherein each image sample comprises a plurality of pixels; and wherein the plurality of different image correlations comprises a first image correlation that generates a first correlation score based upon a number of matched pixels and a number of mismatched pixels.

3. The finger sensing device according to claim 2 wherein the first image correlation is based upon the number of matched pixels minus a weighted number of the mismatched pixels.

4. The finger sensing device according to claim 2 wherein the plurality of different image correlations further comprises a second image correlation that generates a second correlation score based upon the number of matched pixels from a predetermined overlap area.

5. The finger sensing device according to claim 1 wherein said controller, for each different image sample correlation, generates respective rankings for different possible displacements; and wherein said controller performs the cross-verifying based upon the rankings for the different possible displacements.

6. The finger sensing device according to claim 1 wherein said controller further determines a velocity of the user's finger based upon the displacement estimate.

7. The finger sensing device according to claim 6 wherein said controller further performs a navigation function based upon the velocity of the user's finger.

8. The finger sensing device according to claim 1 wherein said controller enters a coast mode based upon a failure of the cross-verifying.

9. The finger sensing device according to claim 1 wherein each displacement comprises at least one of a translational displacement and a rotational displacement.

10. The finger sensing device according to claim 1 wherein said finger sensing area comprises an array of electric field sensing pixels.

11. An electronic device comprising:
a housing;
a display carried by said housing;
a finger sensing area carried by said housing to receive a user's finger moved in a sliding motion; and
a controller cooperating with said finger sensing area for generating successive image samples, and
generating a displacement estimate of the user's finger by at least performing a plurality of different image sample correlations between at least one pair of image samples, and cross-verifying results of the plurality of different image sample correlations.

12. The electronic device according to claim 11 wherein each image sample comprises a plurality of pixels; and wherein the plurality of different image correlations comprises a first image correlation that generates a first correlation score based upon a number of matched pixels and a number of mismatched pixels.

13. The electronic device according to claim 12 wherein the first image correlation is based upon the number of matched pixels minus a weighted number of the mismatched pixels.

14. The electronic device according to claim 12 wherein the plurality of different image correlations further comprises a second image correlation that generates a second correlation score based upon the number of matched pixels from a predetermined overlap area.

15. The electronic device according to claim 11 wherein said controller, for each different image sample correlation, generates respective rankings for different possible displacements; and wherein said controller performs the cross-verifying based upon the rankings for the different possible displacements.

16. The electronic device according to claim 11 wherein said controller further determines a velocity of the user's finger based upon the displacement estimate.

17. The electronic device according to claim 16 wherein said controller further performs a navigation function based upon the velocity of the user's finger.

18. The electronic device according to claim 11 wherein said controller enters a coast mode based upon a failure of the cross-verifying.

19. A method of generating a displacement estimate of the user's finger as the user's finger is moved in a sliding motion over a finger sensing area, the method comprising:
using a controller to generate successive image samples; and
using the controller to generate the displacement estimate of the user's finger by at least
performing a plurality of different image sample correlations between at least one pair of image samples, and
cross-verifying results of the plurality of different image sample correlations.

20. The method according to claim 19 wherein each image sample comprises a plurality of pixels; and
wherein the plurality of different image correlations comprises a first image correlation that generates a first correlation score based upon a number of matched pixels and a number of mismatched pixels.

21. The method according to claim 20 wherein the first image correlation is based upon the number of matched pixels minus a weighted number of the mismatched pixels.

22. The method according to claim 20 wherein the plurality of different image correlations further comprises a second image correlation that generates a second correlation score based upon the number of matched pixels from a predetermined overlap area.

23. The method according to claim 19 wherein, for each different image sample correlation, generating respective rankings for different possible displacements; and performing the cross-verifying based upon the rankings for the different possible displacements.

24. The method according to claim 19 further comprising entering a coast mode based upon a failure of the cross-verifying.

* * * * *